United States Patent [19]

Hoppie et al.

[11] Patent Number: 4,644,925
[45] Date of Patent: Feb. 24, 1987

[54] APPARATUS AND METHOD FOR COMPRESSIVE HEATING OF FUEL TO ACHIEVE HYPERGOLIC COMBUSTION

[75] Inventors: Lyle O. Hoppie, Birmingham; Richard Chute, Troy; David H. Scharnweber; Kenneth P. Waichunas, both of Milford, all of Mich.

[73] Assignee: Eaton Corporation, Cleveland, Ohio

[21] Appl. No.: 813,888

[22] Filed: Dec. 26, 1985

[51] Int. Cl.⁴ .................... F02M 27/02; F02M 31/14; F02M 31/18
[52] U.S. Cl. ..................................... 123/558; 123/557
[58] Field of Search ............... 123/543, 554, 557, 558, 123/48 D, 78 D

[56] References Cited

U.S. PATENT DOCUMENTS

| | | |
|---|---|---|
| 1,262,886 | 4/1918 | Wemple . |
| 1,347,631 | 7/1920 | Herch . |
| 1,876,168 | 9/1932 | Richardson . |
| 2,108,706 | 2/1938 | Crillon . |
| 2,110,062 | 3/1938 | Gibson . |
| 2,166,266 | 7/1939 | Schmitt . |
| 2,407,729 | 9/1946 | Taylor . |
| 2,418,175 | 4/1947 | Higginbotham . |
| 2,435,213 | 2/1948 | Hancock . |
| 2,586,278 | 2/1952 | Waters . |
| 2,667,605 | 1/1954 | Massier . |
| 2,855,770 | 10/1958 | Grube . |
| 2,999,534 | 9/1961 | Wagner . |
| 3,044,284 | 7/1962 | Kratzenberger . |
| 3,191,659 | 6/1965 | Weiss . |
| 3,194,222 | 7/1965 | Brown .............................. 123/48 D |
| 3,243,631 | 3/1966 | Clark . |
| 3,299,675 | 1/1967 | Laffitte et al. . |
| 3,518,036 | 6/1970 | Staats et al. .......................... 431/268 |
| 3,681,002 | 8/1972 | Weller et al. ......................... 431/268 |
| 3,765,382 | 10/1973 | Vandenberg . |
| 4,168,678 | 9/1979 | Nohira et al. ................. 123/48 D X |
| 4,201,167 | 5/1980 | Bayley . |
| 4,311,128 | 1/1982 | Bernecker ........................ 123/558 X |
| 4,448,176 | 5/1984 | Hoppie ................................ 123/558 |
| 4,503,833 | 3/1985 | Yunick ................................ 123/545 |

FOREIGN PATENT DOCUMENTS 0451769 11/1927 Fed. Rep. of Germany .
0026974 11/1911 United Kingdom .

Primary Examiner—Willis R. Wolfe, Jr.
Attorney, Agent, or Firm—J. Gordon Lewis; John R. Benefiel

[57] ABSTRACT

A method and apparatus are disclosed for rapidly heating vaporized fuel to elevated temperatures prior to its injection into a combustion chamber to achieve negligible ignition delay and substantially instantaneous completion of the combustion process. Heating of the fuel is initiated by preheating each quantity of fuel with heat extracted from the engine exhaust, and the preheated fuel is vaporized and subsequently rapidly heated to a high temperature by being adiabatically compressed immediately prior to injection into the combustion chamber. The fuel activation effect of compressive heating is alternatively augmented by contact of the fuel with a catalytic material, to achieve hypergolic combustion by a combination of catalysis and heating.

15 Claims, 4 Drawing Figures

APPARATUS AND METHOD FOR COMPRESSIVE HEATING OF FUEL TO ACHIEVE HYPERGOLIC COMBUSTION

BACKGROUND OF THE INVENTION

1. Field of the Invention

The present invention concerns combustion devices and more particularly a method and apparatus for heating fuel prior to its injection into a combustion chamber of a combustion device such as an internal combustion piston engine, to an elevated temperature level sufficient to achieve hypergolic combustion with only negligible delays in ignition and combustion.

2. Description of the Prior Art

It has heretofore been proposed to achieve so called "hypergolic" combustion, particularly of hydrocarbon fuels in an internal combustion engine, such that ignition delay and the time interval required to complete combustion are both negligible once the fuel is introduced into an oxidizing atmosphere.

For a detailed discussion, see U.S. Pat. No. 4,448,176; SAE paper No. 850089 "Hypergolic Combustion in an Internal Combustion Engine"; and, SAE paper No. 820356, "The Influence of Initial Fuel Temperature on Ignition Delay"; each of which are hereby referenced.

Hypergolic combustion has a number of advantages, as detailed in the aforementioned references, particularly in the context of internal combustion reciprocating engines.

As also detailed in the aforementioned references, ignition is believed to occur due to the need for the fuel molecules to be dissassociated into radicals in order to combine with oxygen molecules, which themselves must be disassociated for oxidation to occur. In a typical combustion process, an ignition device such as a spark plug causes a localized increased concentration of fuel radicals in a charge of fuel-air mixture, sufficient for initiation of combustion at that locale. The release of heat from that localized combustion in turn causes additional dissassociation of adjacent fuel molecules to enable combustion to propagate through the entire charge of fuel-air mixture.

As discussed in the aforementioned U.S. Pat. No. 4,448,176, if there is a pretreatment of the fuel such as to cause dissassociation of a critical proportion of molecules in each quantity of fuel, much higher than the proportion occurring at normal temperatures, there is an "activation" of the fuel. This proportion has been computed in the above cited references to be approximately $3 \times 10^{-5}\%$.

If the activating pretreatment is done prior to mixing of the fuel with air, an ignition device is not needed to initiate combustion, and in fact achieves substantially instantaneous ignition and combustion of the fuel upon coming into contact with an oxidizer.

In order that such an increased, critical proportion of fuel molecules be dissassociated into radicals, energy must be expended to bring this proportion of the fuel molecules to the relatively high energy state corresponding to the dissassociated condition of the fuel molecules.

As described in the aforementioned U.S. Pat. No. 4,448,176, if fuel is heated to relatively elevated temperatures in excess of 1000° F., this causes such critical proportion of fuel molecules to be dissassociated to form radicals, since such proportion of the fuel molecules is thereby brought to a high energy state.

In co-pending application Ser. No. 06/812,863 filed on Dec. 26, 1985, there is described a method and system for heating of the fuel to such elevated temperatures by a regenerative heat exchange process, in which the fuel is circulated through a vessel disposed directly in the combustion chamber, with the combustion chamber insulated to retain heat therein. This arrangement, when combined with preheating of the fuel, as with an exchanger in the engine exhaust system, is able to heat the fuel to such elevated temperatures sufficiently, that upon injection into the combustion chamber hypergolic combustion will result.

A disadvantage of regeneratively heating the typical hydrocarbon fuel is the tendency for excessive cracking of the fuel molecules at high temperatures, and the resultant formation of coke, tending to clog the fuel flow passages. It has been discovered that if the fuel is sustained at the elevated temperatures for only very short time periods, this will avoid or alleviate this problem.

Also, while such aforementioned regenerative heating method and system will efficiently heat the fuel to such elevated temperatures, a relatively complex fuel circulation system is necessitated, and the tendency for coke formation is higher due to the longer times required to achieve heating by heat exchange with the products of combustion produced in previous combustion cycles.

Accordingly, it is an object of the present invention to provide an arrangement and method for heating of fuel prior to combustion in a combustion device such as an internal combustion engine to the elevated temperature levels necessary to achieve hypergolic combustion, in which a very rapid heating of the fuel is achieved.

It is a further object of the present invention, to provide such method and arrangement in which the fuel heating system provides the high temperature heating of the fuel, but the residence time of such heated fuel in the flow passages is very short.

SUMMARY OF THE INVENTION

These and other objects of the present invention which will become apparent upon a reading of the following specification and claims, are achieved by a rapid compressive heating of a quantity of fuel immediately prior to injection into the combustion chamber as of an internal combustion engine.

This compression ratio is selected such as to establish heating of the fuel quantity to a sufficiently high temperature level to achieve hypergolic combustion upon introduction into an oxidizing atmosphere, such as air. The fuel must be vaporized prior to compression and such vaporization may be achieved and maintained by initially heating the fuel by extracting waste heat from the exhaust gases, as in a heat exchanger arrangement disposed in the engine exhaust system.

The heated fuel is sprayed into a compression chamber to be vaporized, and the vaporized fuel is compressed in the compression chamber as by a mechanically driven piston. A valving arrangement is then operated to accomplish timed injection of the compressively heated and vaporized fuel into the engine combustion chamber immediately after the compressive heating of the vaporized fuel.

The effect of compressive heating of the fuel may be augmented by a catalytic treatment by passing the same over a catalytic bed such as to be brought into contact therewith immediately prior to flow of the compressed fuel vapor into the combustion chamber.

The valving arrangement may be timed and actuated by means of the compression piston movement. Alternatively a separate independently operated valving mechanism may be utilized for controlling the flow of compressed, vaporized fuel into the combustion chamber.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
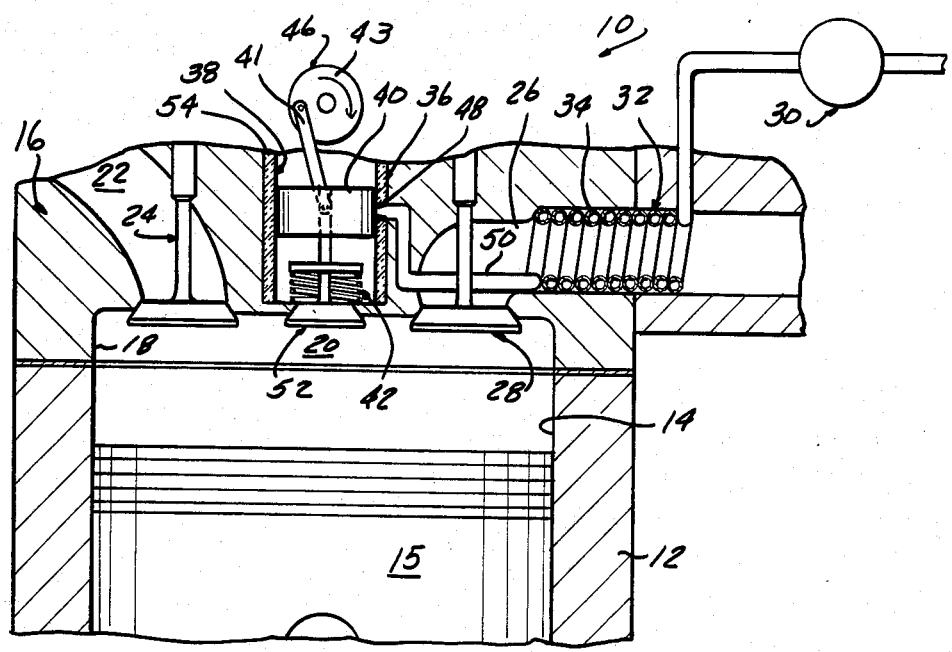
FIG. 1 is a fragmentary, partially sectional view of a cylinder of a reciprocating piston internal combustion engine, depicting an embodiment of the fuel compression apparatus according to the present invention.

Referring to FIG. 1, a single cylinder 10, of a reciprocating piston internal combustion engine is depicted, including a cylinder block 12 formed with a cylinder bore 14, with a piston 15 adapted to be reciprocated therein by a crankshaft, in the manner well known to those skilled in the art.

A cylinder head 16 is formed with internal surface portions 18 which, together with the piston 15 and bore 14, define a combustion chamber 20. The combustion chamber 20 is supplied with air for each combustion cycle, by means including an air intake passage 22, and intake valve 24 provided to control the induction of air into the combustion chamber 20. The intake valve 24 is operated in timed relationship to the movement of the piston 15, as by a camshaft (not shown) to close after induction of an air charge.

The piston 15 compresses the inducted quantity of air, and a quantity of fuel is subsequently intermixed therein during each combustion cycle, instantaneous ignition occurring, according to the concepts of the present invention, by sufficient heating of the fuel charge prior to its introduction into the combustion chamber 20.

An exhaust system is also provided to exhaust the products of combustion after each combustion cycle, including an exhaust passage 26 and exhaust valve 28, which may be operated as by a cam shaft (not shown) for timed opening and closing thereof to control the outflow of the products of combustion from the combustion chamber 20 after each combustion cycle.

A fuel delivery system according to the present invention is depicted in FIG. 1, which includes a source of fuel under pressure, indicated diagrammatically at 30 as a pump receiving fuel from a fuel tank (not shown), and directing the same into a heat exchanger means 32, disposed in the exhaust passage 26, as represented by a coiled length of tubing 34 disposed therein. This effects an initial heating of each quantity of fuel received from the source of fuel 30, which quantity is thereafter directed to a compressor means 36, including a bore 38 which receives a compression piston 40, reciprocated as by a mechanical crank drive 46 including crank 43 and a connecting rod 41 pinned at either end to the piston 40 and crank 43.

The piston 40 and bore 38 thus together define a compression chamber 42 located beneath the piston 40. When the piston 40 is in the elevated position, fuel is introduced through a nozzle 48, connected to a fuel passage 50 connected to the heat exchanger means 34. Thus, preheated fuel is sprayed or injected into the compression chamber 42 to provide a means for vaporizing a quantity of fuel therein, with the heating sufficient to maintain the fuel in a vapor state while undergoing a high degree of compression.

The piston 40 by its downward movement closes the communication of the chamber 42 with fuel spray nozzle 48, and compresses the vaporized fuel to a relatively high degree, i.e., 11:1 or greater, to produce rapid adiabatic compression heating of the quantity of vaporized fuel disposed in the compression chamber 42 to elevated temperature levels, i.e., on the order of 1000° F. For the purposes of this specification, the term "adiabatic" is defined as including substantially or nearly adiabatic.

Supplemental heat, as a heating coil surrounding bore 38 (not shown), may be provided as necessary to maintain the fuel in a vapor state throughout the compression thereof.

Valving means 52 provides a timed injection of the quantity of compressed fuel into the combustion chamber 20 at the completion of the compression stroke of the piston 40. The fuel is thus only momentarily in residence in the compression chamber 42 at its elevated temperature, such as to minimize the formation of coke deposits.

In order to maintain the high fuel temperature, an insulating lining 54 as of zirconium oxide may be provided surrounding the bore 38 such as to insure hypergolic combustion in the combustion chamber 20 immediately upon injection of the fuel into the compressed air.

Figure 2:
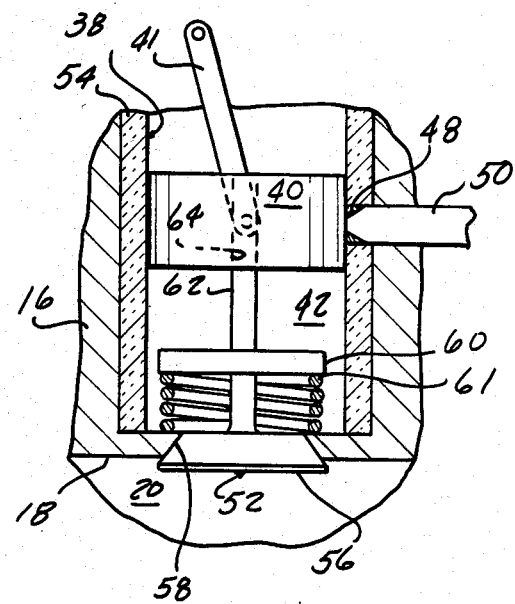
FIG. 2 is an enlarged fragmentary sectional view of the compression chamber and piston arrangement shown in FIG. 1.

The valving means 52 as shown includes a poppet valve 56 cooperating with a valve seat 58 machined in a cylinder end wall adjacent the bore 38. A spring 61 is interposed between the end wall and the shoulder 60 on a valve stem 62 which is affixed to the poppet valve 56 such as to urge the valve 56 to the closed position as shown in FIG. 2.

The valve stem 62 is piloted into a corresponding bore 64 formed into the center of the piston 40. Accordingly, after the piston 40 has moved downwardly to fully compress the fuel in the compression chamber 42, it thereafter contacts the shoulder 60, overcoming the closing force of the spring 61 and allows fuel to be expelled into the combustion chamber 20 upon lifting of the valve 56 from the valve seat 58.

It can be appreciated that the very rapid heating which occurs upon adiabatic compression of the vaporized fuel minimizes the residence time of the vaporized fuel in the chamber 42 at elevated temperatures, and accordingly minimizes the tendancy of the decomposed hydrocarbons to form coke.

At the same time, the arrangement does not necessitate complex heat exchanger arrangements within the combustion chamber 20, or inefficient auxiliary heating sources.

Figure 3:
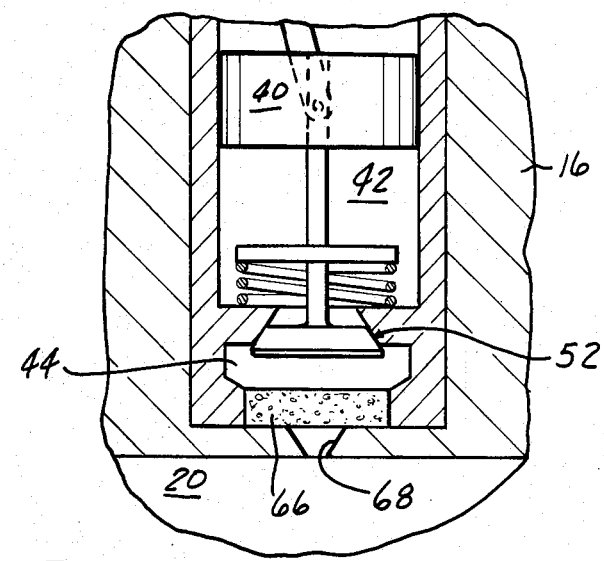
FIG. 3 is an enlarged sectional view of an alternative embodiment of the compression chamber-valving arrangement according to the present invention, incorporating a catalytic treatment chamber.

Referring to FIG. 3, there is shown an arrangement for augmenting the activation of the fuel by the formation of a substantially increased proportion of radicals by catalysis. In this instance, the compression chamber 42 is in communication with a catalytic chamber 44 interposed between the valving means 52 and the combustion chamber 20. Within the catalytic chamber 44 is a volume of catalytic material 66 in a porous configuration to allow flow therethrough of the compressed quantity of fuel while creating intimate contact of the fuel with the catalytic material. Such catalytic materials are well known, such as platinum metal, which may be presented as plating on the exposed surfaces of a porous body. Such catalytic contact with the heated vaporized fuel aids in the disassociation of a proportion of the molecules into radicals. Thereafter the fuel is passed through a port 68 directly into the combustion chamber 20.

Accordingly, the combined effect of catalytic treatment and heating of the vaporized fuel allows somewhat less severe compression of the vaporized fuel and resultant lower fuel temperatures by the augmenting effect of the catalytic treatment and the formation of fuel radicals to enable hypergolic combustion at a lower fuel temperature at injection into the combustion chamber.

Figure 4:
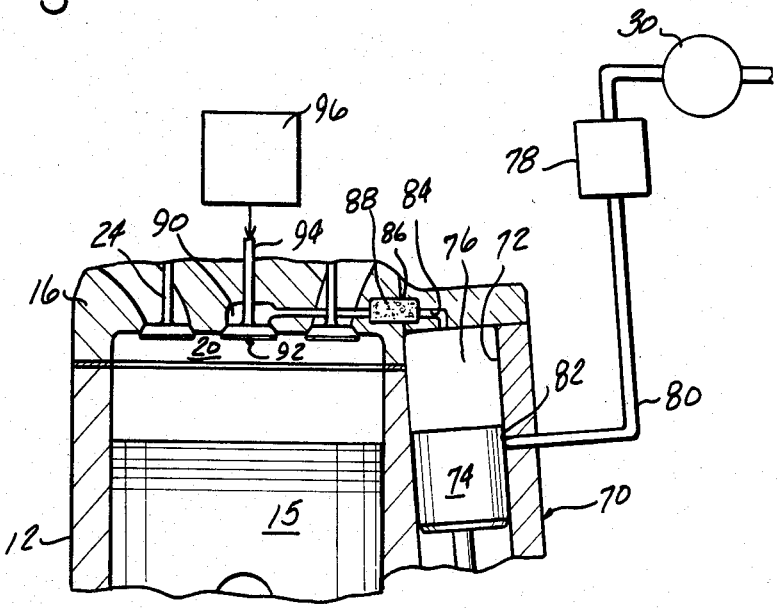
FIG. 4 is an alternate embodiment of the compression chamber and valving arrangement of the apparatus according to the present invention.

An independent control over the valving means 52 is preferred and can be achieved by the arrangement shown in FIG. 4 in which a cylinder 70 is located alongside the main engine cylinder 12, having a cylinder bore 72 formed therein, and a piston 74 reciprocable therein, with a drive means (not shown) for reciprocating the piston 74 in the cylinder bore 72, to define a compression chamber 76. A fuel supply means 30 is similarly provided, with preheating means indicated diagrammatically at 78 heating the fuel prior to its admission into the compression chamber 76 via passage 80 and spray nozzle 82.

The vaporized fuel compressed in the compression chamber 76 flows through a passage 84 to a catalytic chamber 86 containing catalytic bed 88 therein, within a housing formed in the cylinder head 16 as shown. Fuel passing over the catalytic bed 86 thereafter passes into a valving port 90 with a valving member 92 controlling the communication with the combustion chamber 20.

The valve member 92 is connected to a valve stem 94, in turn drivingly engaged by a suitable valve operating mechanism indicated diagrammatically at 96. Such mechanism may take the form of a solenoid, other electromagnetic operator or by a suitable mechanical operator.

Accordingly, the valve timing may be controlled independently of the movement of the piston 74, such as to optimize the timing and duration of the opening of the valve 92 to optimize the timing and duration of injection of the fuel charge into the combustion chamber 20.

Accordingly, it can be appreciated that the above recited objects of the invention have been achieved by a relatively simple arrangement and method for creating a very rapid heating of vaporized fuel to elevated levels, in which the hypergolic combustion is enabled, which method and arrangement allows a short residence time of the heated fuel in the various fuel supply passages.

At the same time the arrangement utilizes simple mechanical elements and thus is highly reliable in operation.

We claim:

1. A method of heating fuel prior to introduction into the combustion chamber of a combustion device in order to achieve hypergolic combustion therein said combustion device of the type including an air intake system for introducing an air charge into said combustion chamber, during each operational cycle of said device an exhaust system for removing products of combustion from said combustion chamber after each operational cycle of said device, and a fuel supply system for supplying fuel to said combustion chamber, comprising the steps of:

vaporizing a quantity of said fuel required for a combustion cycle of said device;

compressing said quantity of fuel adiabatically, to heat said vaporized fuel sufficiently to achieve hypergolic combustion; and controllably directing said quantity of heated compressed fuel into said air charge in said combustion chamber, during a period in each combustion cycle of said device to thereby cause hypergolic combustion therein.

2. The method according to claim 1, wherein in said compressing step, said fuel is compressed on the order of 11:1 ratio or greater to raise the temperature of said fuel to a temperature on the order of 1000° F.

3. The method according to claim 1 wherein said quantity of fuel is brought into contact with a catalytic material prior to being introduced into said combustion chamber to partially activate said fuel to enable hypergolic combustion by the combined effect of compressive heating and catalytic contact.

4. The method according to claim 1, wherein in said vaporizing step, said fuel is initially heated to assist in achieving and maintaining vaporization of said fuel.

5. The method according to claim 4 wherein said initial heating is achieved by heating said fuel by heat extracted from combustion gases exhausted from said combustion chamber.

6. In a combustion device of the type including a combustion chamber, an air intake system for introducing an air charge into said combustion chamber during each operational cycle of said device, an exhaust system for removing products of combustion from said combustion chamber after each operational cycle, a fuel supply system for introducing fuel into said combustion chamber, the improvement comprising fuel vaporizing means for vaporizing said fuel prior to introduction into said combustion chamber; compressor means for adiabatically compressing a quantity of vaporized fuel to a degree to sufficiently heat the quantity of fuel to enable substantially hypergolic combustion in said combustion chamber; and, valving means for controllably directing said compressed vaporized fuel into said air charge in said combustion chamber, during a period in each combustion cycle, whereby hypergolic combustion of said fuel is achieved in said combustion chamber.

7. A combustion device according to claim 6 wherein said vaporized fuel is heated by said compressor means to a temperature on the order of 1000° F.

8. A combustion device according to claim 6 wherein said vaporized fuel is compressed approximately to an 11:1 ratio or greater by said compressor means.

9. A combustion device according to claim 6 further including catalytic treatment means bringing said compressed vaporized fuel into contact with a catalytic bed prior to being directed into said combustion chamber.

10. A combustion device according to claim 6 wherein said vaporizer means includes preheating means heating said fuel prior to compression by said compressor means.

11. A combustion device according to claim 10 wherein said preheating means comprises heat exchanging means associated with said engine exhaust system transferring heat from products of combustion from said combustion chamber into said fuel to vaporize said fuel prior to compression by said compressor means.

12. A combustion device according to claim 6 wherein said compressor means includes a compression chamber receiving vaporized fuel from said vaporizing means, and a piston movably mounted in said chamber so as to compress vaporized fuel in said compression chamber, and drive means for reciprocally moving said piston in said chamber.

13. A combustion device according to claim 12 wherein said compression chamber is thermally insulated to maximize adiabatic compression heating of said fuel.

14. A combustion device according to claim 12 wherein said valving means controls communication between said compression chamber and said combustion chamber.

15. A combustion device according to claim 14 further including a catalyst chamber in communication with said compression chamber so as to receive said compressed fuel, said catalyst chamber containing a catalytic bed disposed to contact said compressed vaporized fuel prior to being directed into said combustion chamber, whereby said fuel molecules are raised to an activated energy state by the combined effect of said heating by compression and by contact with said catalytic bed.

* * * * *